US012034502B2

(12) United States Patent
Koskela et al.

(10) Patent No.: US 12,034,502 B2
(45) Date of Patent: Jul. 9, 2024

(54) METHOD AND APPARATUS USED FOR COMMUNICATING A BEAM CHANGE INDICATION BASED ON AN ACTUAL BEAM INDEX VALUE AND LOGICAL BEAM INDEX VALUE VALIDATION

(71) Applicant: Nokia Technologies Oy, Espoo (FI)

(72) Inventors: Timo Koskela, Oulu (FI); Samuli Turtinen, Ii (FI); Juho Pirskanen, Kangasala (FI)

(73) Assignee: Nokia Technologies Oy, Espoo (FI)

( * ) Notice: Subject to any disclaimer, the term of this patent is extended or adjusted under 35 U.S.C. 154(b) by 112 days.

(21) Appl. No.: 17/243,814

(22) Filed: Apr. 29, 2021

(65) Prior Publication Data

US 2021/0281296 A1  Sep. 9, 2021

Related U.S. Application Data

(63) Continuation of application No. 16/311,260, filed as application No. PCT/IB2017/053745 on Jun. 22, 2017, now abandoned.
(Continued)

(51) Int. Cl.
*H04B 7/06* (2006.01)
*H04B 7/0417* (2017.01)
(Continued)

(52) U.S. Cl.
CPC ........... *H04B 7/0417* (2013.01); *H04B 7/063* (2013.01); *H04B 7/0639* (2013.01);
(Continued)

(58) Field of Classification Search
CPC .... H04B 7/0639; H04B 7/088; H04B 7/0617; H04B 7/022; H04B 7/0408; H04B 7/06966; H04B 7/06952; H04B 7/06958
See application file for complete search history.

(56) References Cited

U.S. PATENT DOCUMENTS

2008/0240001 A1\* 10/2008 Struhsaker ............ H04L 1/0042
370/280
2014/0098689 A1    4/2014 Lee ............................... 370/252
(Continued)

FOREIGN PATENT DOCUMENTS

KR          101561485 B1     10/2015
WO     WO-2016/056980 A1     4/2016
(Continued)

*Primary Examiner* — Salvador E Rivas
(74) *Attorney, Agent, or Firm* — Harrington & Smith

(57) ABSTRACT

Method, apparatus, and computer program product for a user equipment to receive a downlink control information message from an access point in a wireless communications network and to echo a new beam index in the PUCCH feedback resource in response to the message indicating a PUCCH feedback resource and containing a beam change information or in response to the message indicating a downlink grant containing a beam change indication MAC control element but so CSI-feedback is scheduled for the PUCCH feedback resource. If a scheduling request resource is indicated by the message or the MAC control element, the user equipment is triggered to transit a scheduling request on that indicated scheduling request resource. If a scheduling request resource is not indicated by the message or the MAC control element, the user equipment is triggered to perform a scheduling request procedure on a periodic scheduling request resource.

20 Claims, 8 Drawing Sheets

Related U.S. Application Data

(60) Provisional application No. 62/353,832, filed on Jun. 23, 2016.

(51) Int. Cl.
| | |
|---|---|
| *H04B 7/08* | (2006.01) |
| *H04W 72/0446* | (2023.01) |
| *H04W 72/1268* | (2023.01) |
| *H04W 72/21* | (2023.01) |
| *H04W 16/28* | (2009.01) |
| *H04W 36/00* | (2009.01) |
| *H04W 36/06* | (2009.01) |
| *H04W 48/12* | (2009.01) |
| *H04W 72/51* | (2023.01) |

(52) U.S. Cl.
CPC ....... *H04B 7/0695* (2013.01); *H04B 7/06952* (2023.05); *H04B 7/06958* (2023.05); *H04B 7/088* (2013.01); *H04W 72/0446* (2013.01); *H04W 72/1268* (2013.01); *H04W 72/21* (2023.01); *H04B 7/0626* (2013.01); *H04W 16/28* (2013.01); *H04W 36/0083* (2013.01); *H04W 36/06* (2013.01); *H04W 48/12* (2013.01); *H04W 72/51* (2023.01)

(56) References Cited

U.S. PATENT DOCUMENTS

| | | | |
|---|---|---|---|
| 2014/0120926 | A1 | 5/2014 | Shin et al. |
| 2014/0323143 | A1 | 10/2014 | Jung ............................ 455/452 |
| 2015/0043439 | A1* | 2/2015 | Sajadieh ............... H04L 5/0035 370/329 |
| 2016/0007261 | A1* | 1/2016 | Oh ................... H04W 36/0058 455/438 |
| 2016/0105817 | A1 | 4/2016 | Frenne et al. .................... 24/10 |
| 2017/0288763 | A1* | 10/2017 | Yoo .......................... H01Q 3/30 |
| 2017/0302414 | A1* | 10/2017 | Islam ................... H04B 7/0421 |
| 2017/0359826 | A1 | 12/2017 | Islam |
| 2018/0132221 | A1 | 5/2018 | Guo |
| 2018/0279134 | A1* | 9/2018 | Malik .................. H04W 16/28 |
| 2019/0007116 | A1* | 1/2019 | Chang ................. H04B 7/0617 |
| 2019/0013857 | A1* | 1/2019 | Zhang ................. H04W 74/04 |
| 2019/0104549 | A1* | 4/2019 | Deng .................. H04W 72/14 |
| 2020/0037297 | A1 | 1/2020 | Pan |
| 2020/0092899 | A1 | 3/2020 | Ryu |

FOREIGN PATENT DOCUMENTS

| | | | | |
|---|---|---|---|---|
| WO | WO-2016068521 A1 * | 5/2016 | .......... | H04B 7/0452 |
| WO | WO-2016/086144 A1 | 6/2016 | | |
| WO | WO-2016173669 A1 * | 11/2016 | .......... | H04B 17/318 |

* cited by examiner

METHOD AND APPARATUS USED FOR COMMUNICATING A BEAM CHANGE INDICATION BASED ON AN ACTUAL BEAM INDEX VALUE AND LOGICAL BEAM INDEX VALUE VALIDATION

CROSS-REFERENCE TO RELATED APPLICATIONS

This application is a continuation of U.S. patent application Ser. No. 16/311,260, filed on Dec. 19, 2018, which is a National Stage application of PCT/IB2017/053745, filed on Jun. 22, 2017, which claims priority to U.S. Provisional Patent Application No. 62/353,832, filed on Jun. 23, 2016, the disclosures of which are incorporated herein in their entirety.

TECHNICAL FIELD

This invention relates to wireless communications, and more particularly to the establishment of a wireless connection between user equipment and a radio access network with 5G radio access technology being developed involving beamforming and the indications exchanged regarding the beamforming.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Acronyms used in the drawings and this disclosure are defined at the end of this disclosure.

Wireless radio access technologies continue to be improved to handle increased data volumes and larger numbers of subscribers. The 3GPP organization is developing 5th Generation (5G) wireless networks utilizing beamforming.

One current area of discussion within certain 3GPP groups working on 5G systems regards beamforming at the user equipment (UE) side. For many years it has not been uncommon for UEs to have multiple antennas of their own but exploiting the UE's MIMO capabilities has been somewhat less robust as compared to exploiting the potential of MIMO at the network side. Based on beamformed downlink reference signaling, the UE can make beam-specific measurements and feed back to the network the index of what the UE sees as the best downlink beam.

For example, Beam State Information (BSI) is a report containing beam related information, for example, BSI field=Beam Index—Beam RSRP. Depending on the signaling channel, BSI may have different formats. For example, if PUCCH is used then only limited number of fields (e.g. one or two BSI field(s)) may be included. If MAC CE or PUSCH (refers to a physical layer multiplexing of uplink control information (UCI) on UL-SCHI) is used, then multiple BSI fields may be signaled in one control element (CE)/UCI message.

Beam Refinement Information (BRI) is a report containing beam related information corresponding to beam refinement process (measured from BRRS signals which are additional beam reference signals transmitted by 5G-NB to allow UE to refine/determine its RX beams). BRI field=refinement beam index—beam RSRP. Depending on the signaling channel BRI may have different formats e.g. if PUCCH is used only one BRI field is included. If MAC CE is used, multiple BRI fields may be signaled in one CE.

Thus, methods for forming 5G-NB beam groups and related signaling are being discussed. The 5G (New Radio) standardization work has started in 3GPP and is on a study item phase.

The following abbreviations that may be found in the specification and/or the drawing figures are defined as follows:

| Abbreviation | Definition |
| --- | --- |
| 2G | Second Generation |
| 3G | Third Generation |
| 3GPP | Third Generation Partnership Project |
| 5G | Fifth Generation |
| 5G-NB | Fifth Generation Node Beam |
| ACK | Acknowledged |
| A/N | Acknowledged/Not acknowledged |
| BCI | Beam Change Indication |
| BSI | Beam State Information |
| BRI | Beam Refinement Information |
| BRS | Beam Reference Signal |
| BRRS | Beam Refinement Reference Signal |
| BSR | Buffer Status Report |
| CE | Control Element(s) |
| CQI | Channel Quality Indicator |
| CSI | Channel State Information |
| C-RNTI | Cell Radio Network Temporary Identifier |
| DCI | Downlink Control Information |
| DL | Downlink |
| eNB or eNodeB | Evolved Node B (LTE base station) |
| EPDCCH | Enhanced Physical Downlink Control Channel |
| E-UTRAN | Evolved UTRAN |
| gNB | NR/5G Node B |
| HARQ | Hybrid Automatic Repeat Request |
| L1 | Physical Layer, also termed PHY |
| LCID | Logical Channel Identifier |
| LTE | Long Term Evolution |
| LTE-A | Long Term Evolution - Advanced |
| LTE-M | LTE system to support MTC or M2M |
| Node B (NB) | Node B (base station in UTRAN) |
| MAC | Medium Access Control |
| MAC CE | MAC Control Element |
| MIMO | Multiple In, Multiple Out |
| NACK | Not Acknowledged |
| NB | NodeB, base station |
| PDCP | Packet Data Convergence Protocol |
| PDSCH | Physical Downlink Shared Channel |
| PDCCH | Physical Downlink Control Channel |
| PDU | Protocol Data Unit |
| PHR | Power Headroom Report |
| PRACH | Physical Random Access Channel |
| PRB | Physical Resource Block |
| PUCCH | Physical Uplink Control Channel |
| PUSCH | Physical Uplink Shared Channel |
| RACH | Random Access Channel |
| RAT | Radio Access Technology |
| RBI | Refinement Beam Index |
| RE | Resource Element |
| Rel | Release |
| RSRP | Reference Signal Received Power |
| RSRQ | Reference Signal Received Quality |
| RSSI | Received Signal Strength Indicator |
| RX | Reception |
| SB | Sweeping Block |
| SR | Scheduling Request |
| SRS | Sounding Reference Signal |
| TDD | Time Division Duplexing |
| TRP | Transmit-Receive Point |
| TS | Technical Specification or Technical Standard |
| TTI | Transmission Time Interval |
| TX | Transmission |
| TXRU | Transceiver Unit |
| UCI | Uplink Control Information |

-continued

| | |
|---|---|
| UE | User Equipment |
| UL | Uplink |
| UL-SCH | Uplink Shared Channel |

Other abbreviations not defined above and used herein are defined in the text that follows.

SUMMARY

The invention described herein is directed at a method for UE-side actions upon receiving a beam change indication (BCI) either by DCI signaling or MAC CE and further determining different actions based on various conditions.

This section is intended to include examples and is not intended to be limiting. Exemplary embodiments of the invention discussed herein shorten the time to detect failure in beam change procedure.

An example of an embodiment of the current invention is a method that comprises a user equipment receiving a downlink control information message from an access point in a wireless communications network and echoing a new beam index in the PUCCH feedback resource in response to the message indicating a PUCCH feedback resource and containing a beam change indication or in response to a message indicating a downlink grant containing a beam change indication MAC control element but no CSI-feedback is scheduled for the PUCCH feedback resource. A further example of an embodiment of the current invention is a method that comprises, if a scheduling request resource is indicated by the message or the MAC control element, triggering the user equipment to transmit a scheduling request on that indicated scheduling request resource. A still further example of an embodiment of the current invention is a method that comprises, if a scheduling request resource is not indicated by the message or the MAC control element, triggering the user equipment to perform a scheduling request procedure on a periodic scheduling request resource.

An additional example of an embodiment of the current invention would be an apparatus comprising at least one processor, at least one memory including computer program code, wherein the at least one processor, in response to execution of the computer program code, is configured to cause the apparatus to perform at least the following: receiving a downlink control information message from an access point in a wireless communications network and echoing a new beam index in the PUCCH feedback resource in response to the message indicating a PUCCH feedback resource and containing a beam change indication or in response to a message indicating a downlink grant containing a beam change indication MAC control element but no CSI-feedback is scheduled for the PUCCH feedback resource. A further example of an embodiment ofthe current invention is an apparatus wherein the at least one processor, in response to execution of the computer program code, is configured to cause the apparatus to further perform at least the following: if a scheduling request resource is indicated by the message or the MAC control element, being triggered to transmit a scheduling request on that indicated scheduling request resource. A still further example of an embodiment of the current invention is an apparatus wherein the at least one processor, in response to execution of the computer program code, is configured to cause the apparatus to further perform at least the following: if a scheduling request resource is not indicated by the message or the MAC control element, being triggered to perform a scheduling request procedure on a periodic scheduling request resource.

An additional example of an embodiment of the current invention would be an apparatus comprising mean to receive a downlink control information message from an access point in a wireless communications network and means to echo a new beam index in the PUCCH feedback resource in response to the message indicating a PUCCH feedback resource and containing a beam change indication or in response to a message indicating a downlink grant containing a beam change indication MAC control element but no CSI-feedback is scheduled for the PUCCH feedback resource. A further example of an embodiment of the current invention is an apparatus with further means, if a scheduling request resource is indicated by the message or the MAC control element, to trigger to transmit a scheduling request on that indicated scheduling request resource. A still further example of an embodiment of the current invention is an apparatus with means, if a scheduling request resource is not indicated by the message or the MAC control element, to trigger to perform a scheduling request procedure on a periodic scheduling request resource.

Yet a further example of an embodiment of the current invention would be a computer program product embodied on a non-transitory computer-readable medium in which a computer program is stored that, when being executed by a computer, would be configured to provide instructions to control or carry out receiving a downlink control information message from an access point in a wireless communications network and echoing a new beam index in the PUCCH feedback resource in response the message indicating a PUCCH feedback resource and containing a beam change indication or a message indicating a downlink grant containing a beam change indication MAC control element but no CSI-feedback is scheduled for the PUCCH feedback resource. A further example of an embodiment of the current invention is a computer program product embodied on a non-transitory computer-readable medium in which a computer program is stored that, when being executed by a computer, would be configured to provide further instructions to control or carry out, if a scheduling request resource is indicated by the message or the MAC control element, to trigger to transmit a scheduling request on that indicated scheduling request resource. A still further example of an embodiment of the current invention is a computer program product embodied on a non-transitory computer-readable medium in which a computer program is stored that, when being executed by a computer, would be configured to provide further instructions to control or carry out, if a scheduling request resource is not indicated by the message or the MAC control element, to trigger to perform a scheduling request procedure on a periodic scheduling request resource.

BRIEF DESCRIPTION OF THE DRAWINGS

In the attached Drawing, the following figures are presented to explain the invention.

DETAILED DESCRIPTION OF THE DRAWINGS

Different transceiver architectures are considered for 5G radio access system: digital, analog or so-called hybrid (which utilizes a hybrid of digital baseband processing (such as MIMO Multiple Input Multiple Output and/or digital precoding) and analog beamforming. Although some aspects of this invention may be discussed in the context of analog beamforming (fully analog or hybrid transceiver) it should be appreciated that the methods are applicable also for digital beamforming transceiver architecture To compensate the increased path loss when operating on higher frequencies, beamforming is seen essential for providing cell coverage. The aforementioned transceiver architectures provide means for implementing beamforming in future systems depending on the cost and complexity limitations. As an example, systems deployed to lower frequencies (e.g. ~sub 6 GHz) may be implemented by using fully digital architecture and the higher frequencies, where the number of antenna elements required for cell coverage may range from tens to hundreds, may be implemented by using hybrid-architecture or even fully analog architecture. It should be appreciated that the cut-off frequency between higher and lower frequencies is merely an example.

In 5G, a so-called sweeping subframe may be introduced to provide coverage for common control channel signaling with beamforming. A sweeping subframe consists of sweeping blocks (SB) where a single block covers a specific area of the cell with a set of active beams.

Figure 1:
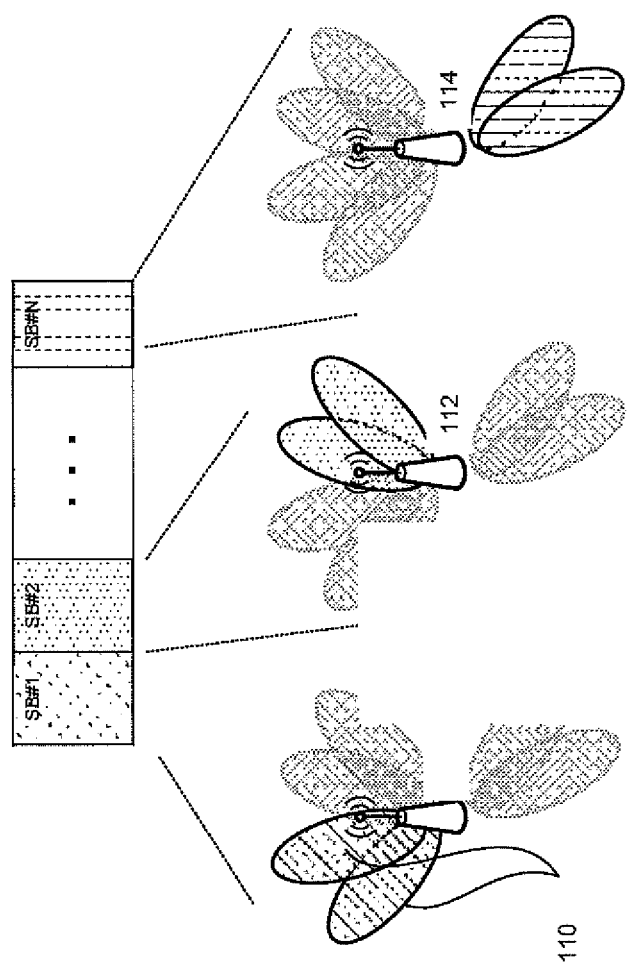
FIG. 1 illustrates a sweeping subframe.

Sweeping subframe is illustrated in FIG. 1 as item 114, where an access point is shown with different active beams during different sweeping blocks. The access point is represented with the different sweeping beams, such that in SB 1 the access point relates to sweeping beam 110, in SB 2 relates to sweeping beam 112, and in SB N relates to sweeping beam 114. The total number of beams required to cover required cell area is typically much larger than the number of concurrent active beams (an active beam is defined as a beam which can be used for communication at a given time) the access point is able to form.

Therefore, access points need to sweep through the cell coverage area in time domain by activating different set of beams on each SB. To provide similar coverage using beamforming for downlink and uplink, similar sweep is needed for both directions. In some cases the radiation patterns of uplink and downlink may differ and potentially different number of beams are used for DL and UL sweep. In some cases Downlink sweep block may have similar length e.g. 1 or more symbols as uplink sweep block or uplink sweep block may have different length to e.g. accommodate PRACH signaling.

As an example of downlink direction if downlink common control channel coverage is provided by the sweeping subframe, each SBs would carry essential cell access information such as DL synchronization signals, system information such as MIB, SIB, or the like (including PRACH/RACH configurations), also paging (or any control information that needs to be broadcasted in a cell). In the uplink direction the sweeping subframe/subframes may accommodate resources for random access channel or other uplink channels requiring periodic availability such as SR (scheduling request) and SRS (sounding reference signal).

In a beamformed system where the cell coverage is provided by multiple beams, it may be beneficial to identify a single beam, for example, by using beam specific reference signals enabling UE to perform beam level detection/separation and perform measurement on beam (specific) reference signals (BRS) such as RSRP, RSRQ (also RSSI), CQI or the like. Identifying different beams may be beneficial, for instance, when a UE indicates to the network the preferred communication beam during an initial access or, for example, when reporting the said measurements to network, mapping a measurement to a common reference index between UE and 5G-NB. The beam specific reference signals may or may not map to (or be derived from) a physical cell identifier or a cell identifier.

To identify a beam, the following mappings can be made, for example, if 8 different BRS signals are transmitted per sweep block, receiver is potentially able to measure 8 different signal indices (beams or beam indices). The same BRS signals may be reused in the next sweep block, thus the sweep block ID needs to be determined to be able to determine the beam index. Thus the beam index may be calculated by Beam index=BRS index*Sweep block index. Sweep block index may be explicitly signaled if the sweep block (sweep symbol or multiple symbols) also conveys information such as MIB/SIB/DL CTRI/DL DATA etc. Or the sweep block may include a specific sequence to identify the block. In one alternative way to identify a beam is to assign different reference signals to each beam. The number of beams, which are supported without reuse of reference signals, is limited by reference signal space.

A UE may perform BRS signal level measurements on downlink sweep on 5G-NB communication beams (detected BRS signals) and report the measurement results to 5G-NB. Alternatively or additionally, the network may also send additional reference signals for the UE to measure and provide feedback. These reference signals may be, for example, so-called BRRS signals (beam refinement signals). Depending on the measured signals different feedback may be used for BRS and BRRS measurements, for instance, BRS measurements may be performed on the beam reference signals which can be directly associated by the UE to a specific beam index while the BRRS measurements may be performed on specific beam reference signals but the beams used to send the signals may not be known at UE side. 5G-NB is able to map the measurement results on each reference signals to actual beam indices.

A UE may feedback the measurement results by using physical layer signaling (e.g. PUCCH/PUSCH) or higher layer signaling such as L2 (MAC) or L3 (RRC) by transmitting a BSI report (Beam State Information) or, in more general terms, a beam report. The BSI report may include information such as Beam Index—Beam RSRP (or RSRQ) of all detected beams or N highest quality beams (where N is an integer). The BSI report format may be limited by the used signaling method such as PUCCH (fixed number of bits)/PUSCH/MAC CE (flexibility determined by the grant size). Depending on the measurement type, whether the measurement was made on BRS or BRRS (or the like) for instance, the report format may be different. For example, when measuring BRS signals, a UE may explicitly detect the beam indexes which it measures but in case of BRRS measurements it may only use logical index of detected beam specific reference signals. The report of BRRS measurements may be referred as BRI (Beam Refinement Information consists of Refinement Beam Index—Beam RSRP value). The beam index space of BSI and BRI may differ in size as BSI report may refer to actual beam indices and BRI report refers to a set of logical values currently measured using BRRS signals (e.g. ranging from 0-7).

In some scenarios, such as in inter-cell mobility reporting, the UE may also feedback the Cell ID to give provide context to the beam level measurements. Further, beam specific reference signals may be derived using physical cell identifier (PCI) which may be transmitted using primary synchronization signal (PSS) and secondary synchronization signals (SSS) or the like.

On higher frequencies, in addition to 5G-NB beamforming, the UE may also use beamforming. The UE may need to steer/form its RX beam to multiple directions to determine the desired or highest quality communication beam/direction. UE may measure several RX directions and determine which direction provides highest quality based on the predefined metrics. Such metrics may show, for example, which RX direction detected the highest RSRP of 5G-NB beam or which RX direction detected the highest number of beams above a specific quality threshold.

As the 5G-NB beam radiation patterns typically overlap (e.g. due to design to provide coverage, due to reflecting radio environment, due to detecting a side lobe of another beam, etc.), a UE may be able to detect multiple beams per RX direction. The UE may then associate the detected 5G-NB beams per its RX direction, so it may group 5G-NB beams to potentially multiple groups. In one example, a special case is where a UE maintains a group of 'one' so that one 5G-NB beam is associated to one UE RX beam. One beam in the group can be, for example, a beam with the highest quality (RSRP) measured by UE. If reciprocity is assumed (e.g. in TDD system) the downlink beam measurements to determine link and channel qualities may be utilized also for reverse direction e.g. best UE RX direction is also the best transmit direction.

Figure 2:
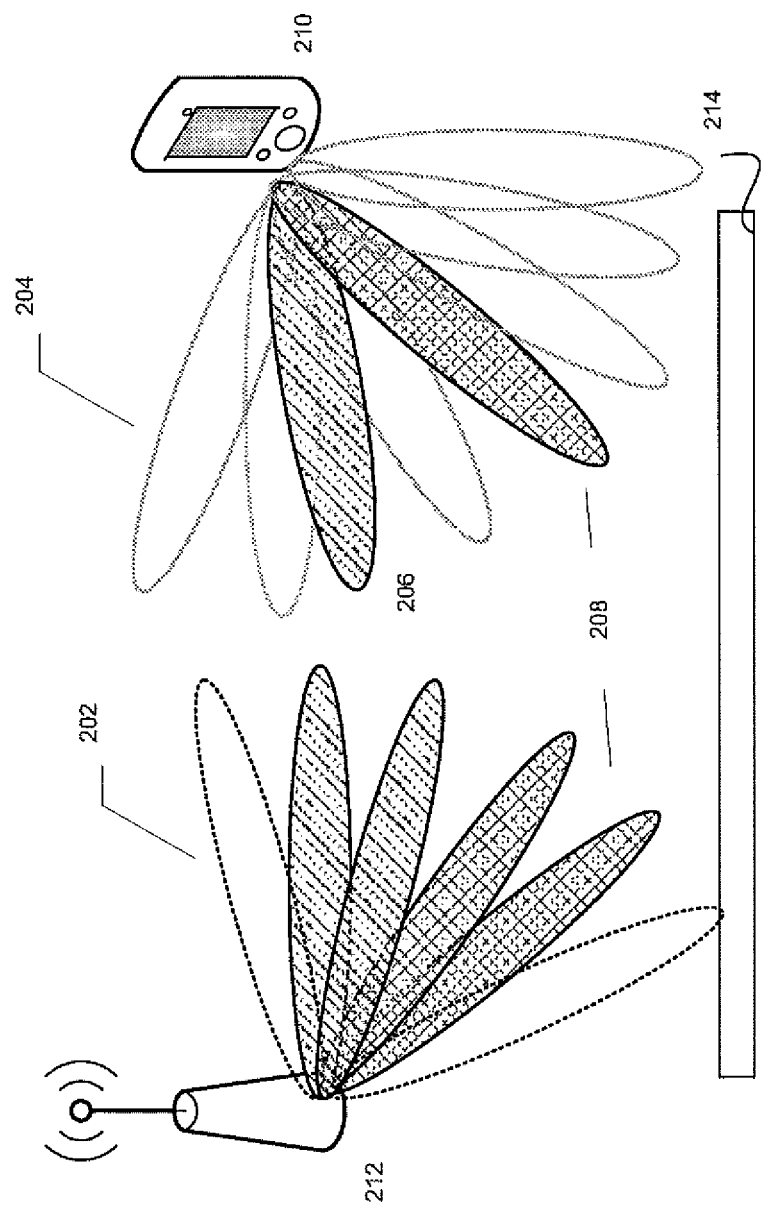
FIG. 2 is an illustration of beam group associations of a single/collocated TRPs or a Cell.

FIG. 2 illustrates the beam grouping on high level, specifically, beam group associations of a single/collocated TRPs or a Cell along with reflecting surface object 214. Access point 212 is illustrated with access point communication beams 202. Based on the BRS measurements by different sets of RX beams, a UE 210 is able to determine an association between a set of 5G-NB beams per its RX direction. The UE 210 is shown with the UE communication beams 204. In case the UE is able to form multiple beams concurrently, for example, 2 beams, it may group the detected 5G-NB beams per RX direction as one group. The FIG. 2 illustrates the grouping example by using so called grid-of-beams. However, in one example the UE may also form alternative beam radiation patterns (wider/narrower) and thus it may be able to detect a different amount of 5G-NB beams but with potentially different (reduced/increased) beamforming gain. As can be seen in FIG. 2, in both beam group association 206 and beam group association 208, the UE communication beams 204 has one beam in each group association while the access point communication beams may have two or more beams in each group association.

Figure 3:
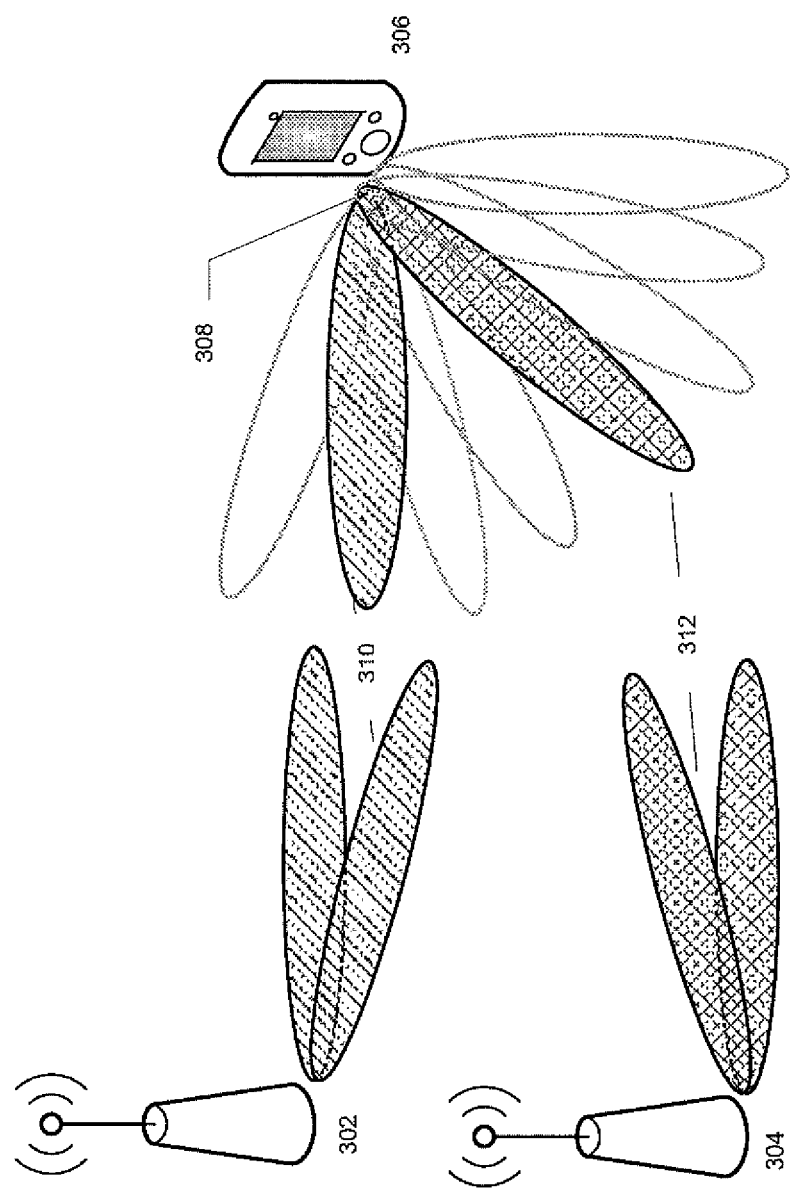
FIG. 3 is an illustration of association of beam groups from different TRPs of a cell.

An illustration of association of beam groups from different TRPs of a cell, FIG. 3 further illustrates a similar example as FIG. 2 with non-collocated TRPs where as in FIG. 2 the TRPs may be collocated or a single TRP is used.

TRP1 302 sweeps out two active beams which are in beam group association 310 with one beam of the UE communications beams 308 of UE 306 while TRP2 304 also sweeps out two other active beams which are in beam group association 312 with one other beam of the UE communications beams 308 of UE 306.

Based on the UE beam reporting 5G-NB may determine a set of beams it may potentially use to communicate with UE, namely, a candidate set of beams. Out of that set, the network may select a smaller set it currently utilizes (at least one beam) for active scheduling Alternatively, if the UE maintains a beam or a set of beams based on UE feedback, it can use them to communicate with to send downlink control channels. These beams can be selected from a set of beams reported by UE. The available set of beams may be called a candidate set and out of that set the 5G-NB may select "serving" beam or beams. Although scheduling commands on PDCCH could be used to detect e.g. a deteriorating beam quality, a UE may aperiodically/periodically update beam groups by providing feedback based on BRS or BRRS measurements for example.

Due to UE mobility or changes in the radio environment (reflections, obstacles, etc.) the current serving beam (or a set of serving beams) may need to be changed. 5G-NB may update the current serving set based on UE feedback on BRS or BRRS signals for example (using Beam State Information or Beam Refinement Information reporting respectively).

Thus, when 5G-NB indicates the serving beam (or a set of serving beams) it currently uses (either for DL transmission or UL reception), the UE would need to align its own communication (TX/RX) beam accordingly. In one example case UE may also utilize a so-called omnidirectional radiation pattern which has equal beamforming gain to all directions. As the pattern radiates equally to all directions the beamforming gain may be less than with directional transmission.

One way to indicate the beam or beam group change by 5G-NB is to refer to the latest UE reported measurement. A UE may send a beam report of N-beams (beam index-RSRP) either by UCI (PUCCH/PUSCH) or MAC layer signaling and the beam change may be indicated by the network by sending a single bit indication in DCI message. This single bit indication may refer to a pre-agreed value, for instance, the highest quality beam previously reported. By indicating a change of beam, the UE determines whether it needs to change its current communication beam as well (there may a preconfigured number of subframes when this change is done). Although a DCI message could be defined to carry full beam index instead of a single bit indication, the DCI messages are typically not acknowledged. Thus, the beam switch indication may not reach UE and so the 5G-NB would have no knowledge if the change indication has been applied. This may lead to a misalignment of 5G-NB and UE communication beams and potentially extra signaling and delay to recover from such error, for instance, by determining the lack of transmission on an allocated grant on PDCCH.

Alternatively, MAC layer signaling (MAC CE) could be used to send a beam index to indicate the new (or current) 5G-NB beam. MAC layer signaling benefits from the feedback loop, namely, HARQ, to ensure that the messages are received correctly. While the HARQ seemingly ensures that the transmitted information is received correctly there is a drawback, namely, that HARQ signaling loop may fail due to NACK-to-ACK error.

Figure 4:
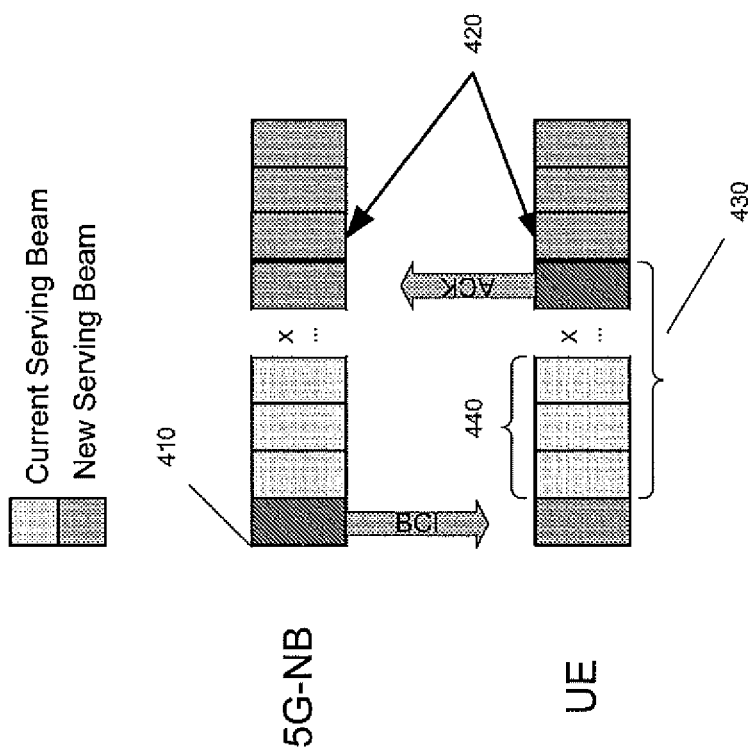
FIG. 4 illustrates beam change by MAC CE.

Regarding beam change, a network may indicate the beam change to UE by signaling an indication of a beam change by assigning a new beam index explicitly, using MAC CE which is shown in FIG. 4. Beam change indication 410 is sent from the 5G-NB to the UE, wherein processing 440 takes place. As shown by item 430, the BCI MAC CE is processed before the HARQ feedback grant time+3+X. As shown by arrows 420, the beam change is done right after transmitting/receiving ACK. In this figure, an example is illustrated where the beam change occurs (new serving beam is used) immediately after the subframe used to transmit ACK. Alternatively if the UE is not able to process the beam change indication fast enough, then a fixed minimum time for beam change may be defined. Such time may include, for example, HARQ processing time and additional processing time for the BCI MAC CE. Additional processing time may also include the subframe to transmit HARQ feedback. If the UE feedback subframe (the feedback subframe may be explicitly scheduled to occur after N subframes of reception of the data) occurs before the fixed minimum time the beam change is done after the fixed minimum time. If the feedback time is larger than the fixed minimum time, then the beam change occurs after the subframe when the feedback (ACK) has been sent. Alternatively or additionally, an additional beam change delay (in subframes) may be added after transmitting ACK to catch the ACK to NACK error for MAC CE. In this case the UE waits for retransmission for given amount of time. If the network retransmits the same transmission block, then the UE would detect an ACK to NACK error and may indicate it by resending an acknowledgement or the indicated SR which is discussed later herein.

Figure 5:
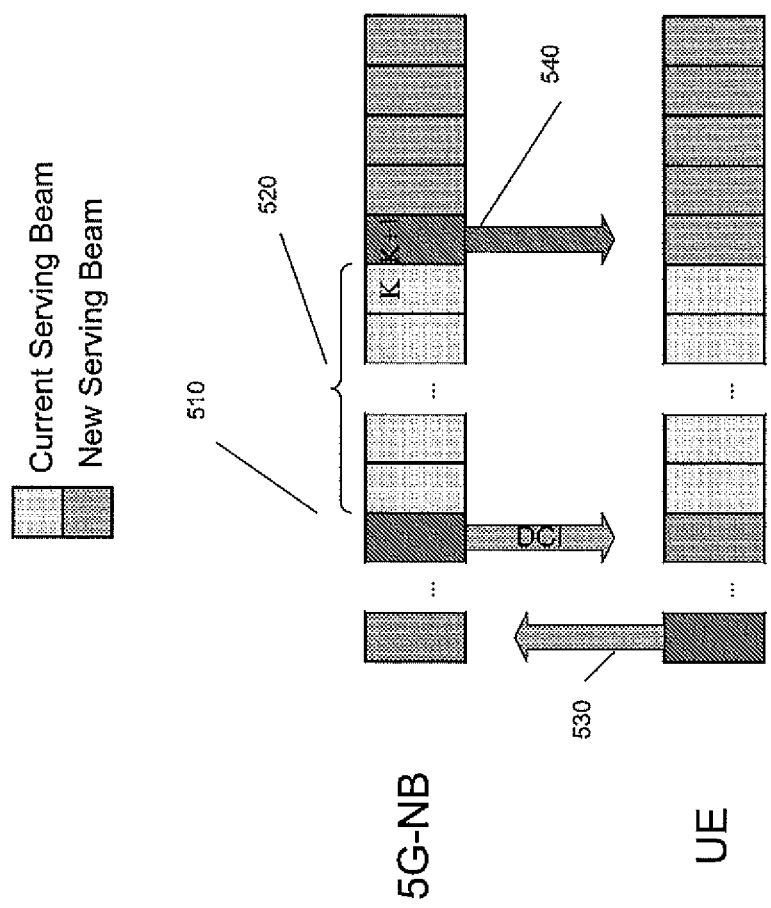
FIG. 5 illustrates beam change by DCI signaling.

A network could also indicate the beam change to UE by signaling an indication of a beam change by referring to a pre-determined or pre-agreed value with single bit indication, as shown in FIG. 5 via DCI. FIG. 5 illustrates a beam change by DCI signaling. Item 510 depicts the beam switch indication DCI. In the figure the beam change is done after K subframes 520 from receiving the beam change indication. Arrow 530 depicts BRI/BSI feedback on xPUCCH. At value K+1, an arrow 540 depicts communication using the new serving beam.

Alternatively, a beam change can be made based on the BRRS measurement. MAC layer (also physical layer) signaling (MAC CE) may be used to couple the logical beam index (referred as Refinement Beam Index, RBI) of a BRRS signal measurement with the actual beam index. As in one example BRRS measurements by UE are performed on reference signals (or ports) without explicit information on which beams were used by 5G-NB to send the said BRRS signals, there 5G-NB may signal the RBI—Beam index mappings to UE (containing multiple values) and indicate beam change by pointing to one RBI-BI mapping in the message. Alternatively after indicating the mapping, SG-NB may signal beam change by referring to a Beam Index value. In one more alternative 5G-NB may only signal one RBI-Beam Index (BI) value to indicate beam change. By using the RBI-BI mapping, UE learns the association between the measured RBI index and the beam index values. RBI index maps to a specific UE RX beam thus providing mapping to a serving beam UE can align its own beams according to the 5G-NB beams. Alternatively 5G-NB may configure the BRRS signals to be transmitted from a preconfigured set of beams which are known at 5G-NB and UE side. This pre-association can be a current candidate beam set for example.

In order to run different UE side triggers, for instance, to determine UE-side reporting triggers based on absolute or relative serving beam quality to other detected beams the UE may need to have up-to-date information of the current 5G-NB serving beam or set of serving beams (and potentially candidate beams) and the mappings to its own RX beams to facilitate successful beam change.

Exemplary embodiments of the invention comprise UE side actions upon receiving a beam change indication (BCI) either by DCI signaling or MAC CE based on conditions discussed below.

For DCI beam change, if the DCI message contains a beam change indication and no MAC layer data is granted (the UL grant has no resource block allocation) but PUCCH feedback resource is signaled, then the UE shall echo the new beam index in the PUCCH resource. Beam index may be coupled with the latest BRS measurement results (Beam RSRP) of the echoed beam index. In the change to last (highest quality) reported beam, the network schedules a PUCCH allocation with the size of at least one beam report. The UE will report the current serving beam (beam index and the quality (RSRP/RSRQ)) which tells the network whether the UE changed the beam.

For DCI beam change, if the DCI message contains beam change indication and explicit SR resource configuration, then the UE shall trigger SR transmission on the indicated resource using new serving beam regardless of other SR triggers. The SR transmission (as in the subsequent paragraphs) may validate the beam change indication sent by network and additionally it may or may not trigger pre-configured/pre-determined resource allocation by 5G-NB to UE to transmit additional information (e.g. MAC CE containing beam information, buffer status, PHR (Power Head Room) etc. report). Thus, the procedure to validate the beam change may only trigger UE-side action to transmit indication on the scheduled SR resource (or the like, could be also RACH resource) and no 5G-NB response is expected as typically in SR procedure.

For MAC CE beam change, if the DCI message indicates a downlink grant and an explicit allocation for SR resource, then the UE shall decode the DL grant and determine if beam change indication (BCI) MAC CE is transmitted by network. If beam change indication MAC CE is detected, then the UE shall transmit SR on the explicitly allocated resource For MAC CE beam change, if no explicit SR allocation is configured, then the UE shall, upon receiving BCI MAC CE, trigger SR procedure on the periodic SR resource (on uplink sweep). Upon receiving UL resource by using SR procedure, the UE shall generate BSI report including at least the indicated beam index in the MAC BCI.

For MAC CE beam change, if BCI MAC CE is transmitted and no SR resource is configured and no CSI-feedback is scheduled for the current (scheduled) PUCCH, then the UE shall echo the new beam index in the PUCCH resource.

A UE may request beam change by network explicitly by signaling a preferred network communication beam index (or by reporting BSI). The network may then respond with above mechanisms.

In above the beam index may also refer to a beam group index.

Further exemplary embodiments of the current invention comprise the following actions if a UE receives a beam change indication.

If a UE receives a beam change indication (to new serving beam) signaled by the network and has not previously (e.g. during last N*BRS measurement periods, where N is configurable) reported Beam State Information, then it shall trigger SR procedure to report BSI information.

If a UE receives a beam change indication to a new serving beam which belongs to different beam group than the current serving beam (groups are reported by UE and determined by the UE RX beams), then it shall trigger SR procedure (which could be on an explicitly signaled resource) to validate the group change using the new beam corresponding to the indicated serving beam. Changing the serving beam in the same beam group may not change the UE beam alignment and thus the allocation of SR resource may not be in present.

If UE receives an indication to change the new beam group (5G-NB may also change the beam group by explicit signaling such as beam group change MAC CE or DCI signaling) it may receive an explicit DCI allocation of an SRS resource (Sounding Reference Signal) or a like. SRS signals are transmitted by UE and used to determine (uplink) channel quality between UE and 5G-NB. Assuming uplink/downlink reciprocity, the UL channel quality may reflect also the DL channel quality similarly as the DL BRS measurements may reflect the UL channel quality. When the SRS allocation is linked together with beam or beam group change the SRS transmission is triggered upon detection of the said change indication on the scheduled resource. UE transmits the SRS on the allocated resource, for example, on PUCCH region (or UL-SCH region if configured) or in the uplink sweep using the beam which is aligned with the new beam group (5G-NB beam groups are associated with UE beams). This enables 50-NB to measure the channel/beam quality of the indicated beam group. In similar manner, to be more general, the similar triggers conditions and UE side actions which are described for SR transmission in the beam change procedure, similarly apply also for SRS. As 5G-NB may allocate only SR resource when indicating a beam change, it may perform channel estimation based on the SR reception. Typically SRS provides better estimation on the channel quality as the signal has typically wider bandwidth.

If UE receives beam change indication and has been configured periodic/aperiodic SR on PUCCH or UL sweep, the next SR opportunity is used to send SR signal regardless of other conditions for SR triggering is met e.g. uplink data availability/BSR (buffer status report)

If based on above conditions, then a BSI report is triggered and at least two BSI fields (BSI=beam index-beam RSRP) can be reported, where the serving beam is reported in PUCCH/MAC level report in a certain position (e.g., first reported beam in a report) regardless of whether or not it is the highest quality beam for the UE. This way the network may, by requesting PUCCH/MAC beam report, confirm the current serving beam quality of the UE.

Embodiments of the invention are concerned with the configuration of SR transmission. It should be appreciated that, as indicated previously, the embodiments may alternatively or additionally be concerned with the configuration of an SRS in place of SR. Alternatively SR and SRS allocations may or may not be mutually exclusive, i.e. both allocations may be configured.

The scheduled SR transmission is performed by a UE using the beam associated to the changed 5G-NB beam index (new serving beam index).

The SR resource may be scheduled by DCI signaling on PUCCH region or in UL sweep (on RACH/SR region).

The SRS resource may be scheduled by DCI signaling on PUCCH region or in UL sweep (on RACH/SR region).

The SR resource may be indicated by a MAC CE or the Beam Change MAC CE may include fields to indicate SR configuration for the scheduled SR transmission The SR resource may be scheduled to a TI when the beam change occurs or N-TTIs (where N is an integer) after a configured beam change or N-TIs after an expected feedback transmission (HARQ feedback or a configured feedback to DCI indication) or may be configured periodically to be valid for a pre-determined/configured time.

In case the UE transmits (HARQ A/N to MAC PDU) feedback to confirm the change the SR resource may be scheduled concurrently with the feedback. The UE may have 2 TXRU implementation and it may use 2 different beams to transmit SR and A/N feedback to different 5G-NB beams.

The UE may have preconfigured set of SR/SRS resources (e.g. SR sequence indices and frequency location and in case of SRS, the bandwidth). The SR resource is scheduled by referring to a UE specific resource configuration by an SR configuration index.

The UE may have preconfigured set of SR resource configurations for beam management actions. The SR resource allocation in the DCI message (or MAC CE) may refer to a specific configuration of a set of SR signals. Configurations may contain one or multiple SR allocations regarding beam management actions such as SR for beam validation, SR for beam recovery (e.g. to indicate that current serving beam is below threshold or other beam is an offset dB better), SR for requesting resource for BSI report, SR for requesting BRRS transmission by 5G-NB, etc. As an example, the different configurations may be indicated by a logical index in the DCI message (or MAC CE) so that configuration_1 refers to specific SR allocations and configuration_2 refers to another set of SR allocations. Alternatively or additionally, the network may configure specific beam management action which the SR allocation refers to upon receiving beam change indication. The SR allocation may be permanent, e.g. override the current SR allocation on uplink sweep or another periodical SR resource.

A scheduled SR resource may include implicit or explicit indication of periodicity, for instance, the SR resource may be periodically available for N-SR occasions, for example, every 10th subframe.

The SR resource or the PUCCH feedback configuration may also be cell specific (not UE specific) and the location of SR resources are pre-configured (e.g. every 2nd subframe, every 4th subframe, every 8th subframe, etc.) so that 5G-NB activates specific SR resources by signaling a SR-resource mask configuration Such configuration may be signaled by using a logical index which maps to a specific configuration; for instance, one configuration may provide one or more SR opportunities in time/frequency/SR resource index grid.

The UE may repeat SR transmission on each scheduled resource until it receives UE specific DL control (e.g. C-RNTI masked PDCCH transmission) or max_number_srTx-times Alternatively, the UL resource allocation comprises of an allocation to transmit MAC CE to confirm the change (for instance, specific LCID is used to indicate).

In one option, if the same SR resource is configured for the UE to confirm the beam change as well as request UL resources, then SR masking solution could be applied where, for instance, every other SR occasion is used for confirming the beam change indication and every other for requesting new UL data.

Figure 6:
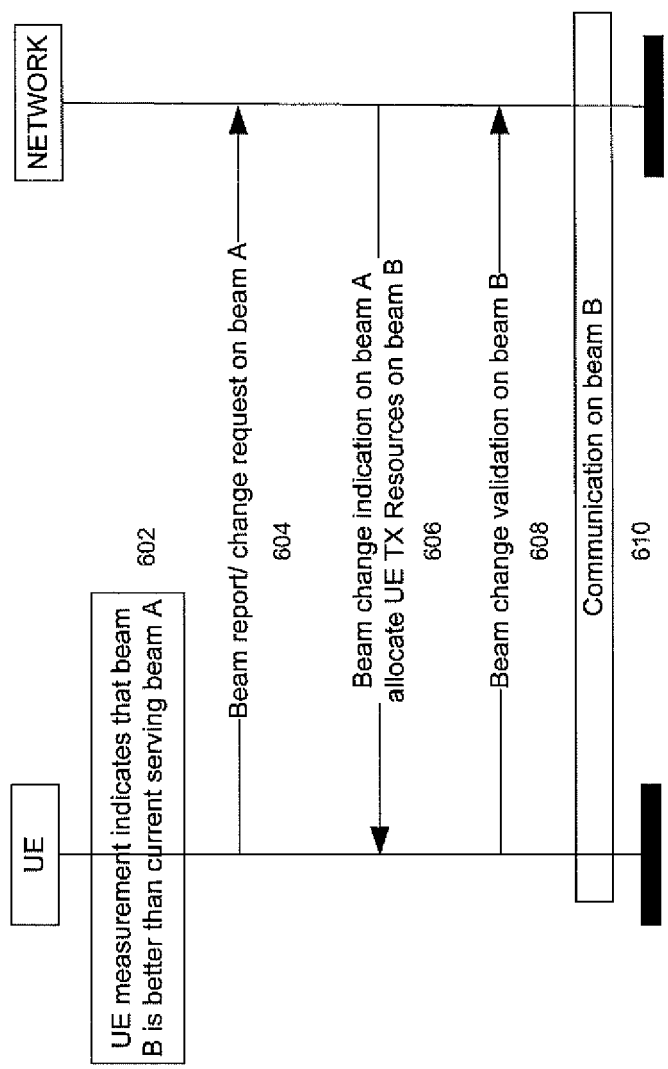
FIG. 6 illustrates validation of the 5G-NB communication beam change.

FIG. 6 is an illustration of validation of the 5G-NB communication beam change. Item 602 represents a UE measurement that indicates that beam B is better in some respect than the currently serving beam A. As can be seen from this figure, in item 604, a beam change may be initiated based on the UE beam report or an explicit request to change beam to a specific index, this signal being sent on beam A. Based on the beam report or request, the network may determine the need for a beam change. Item 606 shows the beam change indication on beam A to allocate UE Tx resources on beam B. So, the network signals the beam change indication (either DCI or MAC CE/RRC message) and, additionally, the uplink signaling resource to validate the beam change. The UE transmits the validation signal using the beam which is aligned to the indicated 5G-NB beam as further shown by item 608. Communication then continues on beam B as shown by item 610.

In an embodiment of the invention, if 5G-NB does not detect transmission on scheduled or triggered SR, it may trigger retransmission of a Beam Change Indication using both new serving beam and the previous (old) serving beam and indicate a retransmission of beam change indication; thereupon correct reception, triggering a BSI report at UE side.

In another embodiment of the invention, if 5G-NB does not detect transmission on scheduled or triggered SR, cell/RAN paging on the next Paging (sweep) subframe or in a dedicated paging message and indicate cause value, such as link re-establishment. Using dedicated paging message or simply a DCI message 5G-NB may need to repeat the transmission to multiple direction. Reception of such message may trigger the UE to report BSI.

In one further embodiment, the scheduled SR resource may have no relation to sending SR, for instance, on other allocated resource or in other configured events (e.g. UL data based, sending BSR), for example, when the beam change may occur with DL traffic only and new UL data may be available at UE after sending scheduled SR on the resource indicated in beam change procedure.

In one example, in case 5G-NB indicates the new serving beam out of the same beam group (previously reported by UE), this may not trigger SR transmission or 5G-NB may not explicitly schedule such resource.

Figure 7:
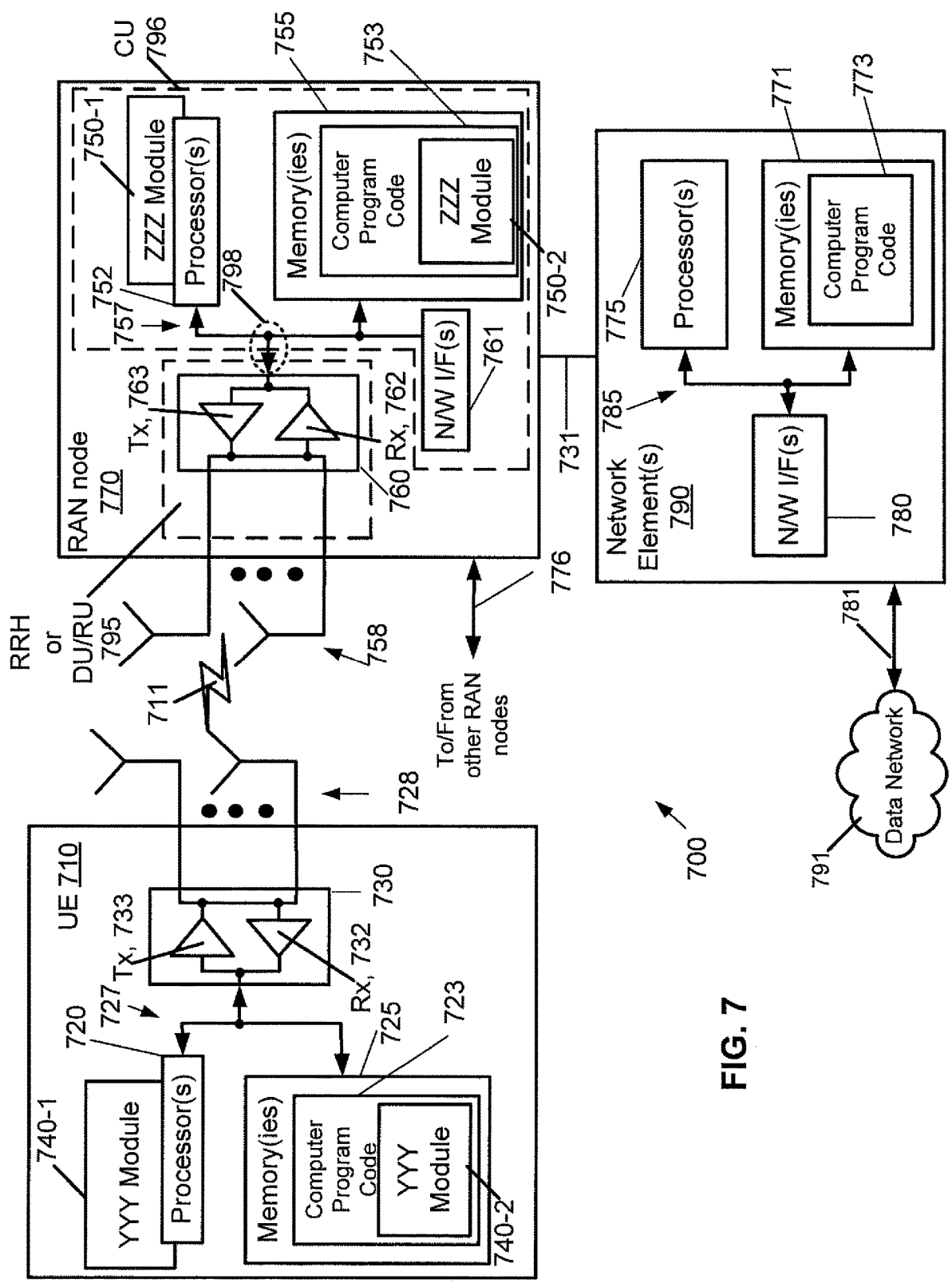
FIG. 7 is a block diagram of an exemplary system in which the exemplary embodiments may be practiced.

Turning to FIG. 7, this figure shows a block diagram of one possible and non-limiting exemplary system in which the exemplary embodiments may be practiced. In FIG. 7, a user equipment (UE) 110 is in wireless communication with a wireless network 700. A UE is a wireless, typically mobile device that can access a wireless network. The UE 710 includes one or more processors 720, one or more memories 725, and one or more transceivers 730 interconnected through one or more buses 727. Each of the one or more transceivers 730 includes a receiver, Rx, 732 and a transmitter, Tx, 733. The one or more buses 727 may be address, data, or control buses, and may include any interconnection mechanism, such as a series of lines on a motherboard or integrated circuit, fiber optics or other optical communication equipment, and the like. The one or more transceivers 730 are connected to one or more antennas 728. The one or more memories 725 include computer program code 723. The UE 710 includes a YYY module 740, comprising one of or both parts 740-1 and/or 740-2, which may be implemented in a number of ways. The YYY module 740 may be implemented in hardware as YYY module 740-1, such as being implemented as part of the one or more processors 720. The YYY module 740-1 may be implemented also as an integrated circuit or through other hardware such as a programmable gate array. In another example, the YYY module 740 may be implemented as YYY module 740-2, which is implemented as computer program code 723 and is executed by the one or more processors 720. For instance, the one or more memories 725 and the computer program code 723 may be configured to, with the one or more processors 720, cause the user equipment 710 to perform one or more of the operations as described herein. The UE 710 communicates with eNB 770 via a wireless link 711.

The gNB (NR/5G Node B) 770 is a base station (e.g., for 5G) that provides access by wireless devices such as the UB 710 to the wireless network 700. The gNB 770 includes one or more processors 752, one or more memories 755, one or more network interfaces (N/W I/F(s)) 761, and one or more transceivers 760 interconnected through one or more buses 757. Each of the one or more transceivers 760 includes a receiver, Rx, 762 and a transmitter, Tx, 763. The one or more transceivers 760 are connected to one or more antennas 758. The one or more memories 755 include computer program code 753. The gNB 770 includes a ZZZ module 750, comprising one of or both parts 75G-1 and/or 75G-2, which may be implemented in a number of ways. The ZZZ module 750 may be implemented in hardware as ZZZ module 75G-1, such as being implemented as part of the one or more processors 752. The ZZZ module 75G-1 may be implemented also as an integrated circuit or through other hardware such as a programmable gate array. In another example, the ZZZ module 750 may be implemented as ZZZ module 75G-2, which is implemented as computer program code 753 and is executed by the one or more processors 752. For instance, the one or more memories 755 and the computer program code 753 are configured to, with the one or more processors 752, cause the gNB 770 to perform one or more of the operations as described herein. The one or more network interfaces 761 communicate over a network such as via the links 776 and 731. Two or more gNBs 770 communicate using, e.g., link 776. The link 776 may be wired or wireless or both and may implement, e.g., an X2 interface.

The one or more buses 757 may be address, data, or control buses, and may include any interconnection mechanism, such as a series of lines on a motherboard or integrated circuit, fiber optics or other optical communication equipment, wireless channels, and the like. For example, the one or more transceivers 760 may be implemented as a remote radio head (RRH) 795, with the other elements of the gNB 770 being physically in a different location from the RRH, and the one or more buses 757 could be implemented in part as fiber optic cable to connect the other elements of the gNB 170 to the RRH 795.

It is noted that description herein indicates that "cells" perform functions, but it should be clear that the gNB that forms the cell will perform the functions. The cell makes up part of a gNB. That is, there can be multiple cells per gNB.

The wireless network 700 may include a network control element (NCE) 790 that may include MME (Mobility Management Entity)/SGW (Serving Gateway) functionality, and which provides connectivity with a further network, such as a telephone network and/or a data communications network (e.g., the Internet). The gNB 770 is coupled via a link 731 to the NCE 790. The link 731 may be implemented as, e.g., an S1 interface. The NCE 790 includes one or more processors 775, one or more memories 771, and one or more network interfaces (N/W I/F(s)) 180, interconnected through one or more buses 785. The one or more memories 771 include computer program code 773. The one or more memories 771 and the computer program code 773 are configured to, with the one or more processors 775, cause the NCE 7190 to perform one or more operations.

The wireless network 700 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 752 or 775 and memories 755 and 771, and also such virtualized entities create technical effects.

The computer readable memories 725, 755, and 771 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 725, 755, and 771 may be means for performing storage functions. The processors 720, 752, and 775 may be of any type suitable to the local technical environment, and may include one or more of general purpose computers, special purpose computers, microprocessors, digital signal processors (DSPs) and processors based on a multi-core processor architecture, as non-limiting examples. The processors 720, 752, and 775 may be means for performing functions, such as controlling the UE 710, gNB 770, and other functions as described herein.

In general, the various embodiments of the user equipment 710 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Embodiments herein may be implemented in software (executed by one or more processors), hardware (e.g., an application specific integrated circuit), or a combination of software and hardware. In an example of an embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 7. A computer-readable medium may comprise a computer-readable storage medium or other device that may be any media or means that can contain or store the instructions for use by or in connection with an instruction execution system, apparatus, or device, such as a computer.

The current architecture in LTE networks is fully distributed in the radio and fully centralized in the core network. The low latency requires bringing the content close to the radio which leads to local break out and multi-access edge computing (MEC). 5G may use edge cloud and local cloud architecture. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services and augmented reality. In radio communications, using edge cloud may mean node operations to be carried out, at least partly, in a server, host or node operationally coupled to a remote radio head or base station comprising radio parts. It is also possible that node operations will be distributed among a plurality of servers, nodes or hosts. It should also be understood that the distribution of labor between core network operations and base station operations may differ from that of the LTE or even be non-existent. Some other technology advancements probably to be used are Software-Defined Networking (SDN), Big Data, and all-IP, which may change the way networks are being constructed and managed.

One possible manner to carry out embodiments described herein is with an edge cloud using a distributed computing system. An exemplary embodiment comprises a radio node connected to a server. Exemplary embodiments implementing the system allow the edge cloud server and the radio node as stand-alone apparatuses communicating with each other via a radio path or via a wired connection or they may be located in a same entity communicating via a wired connection.

Figure 8:
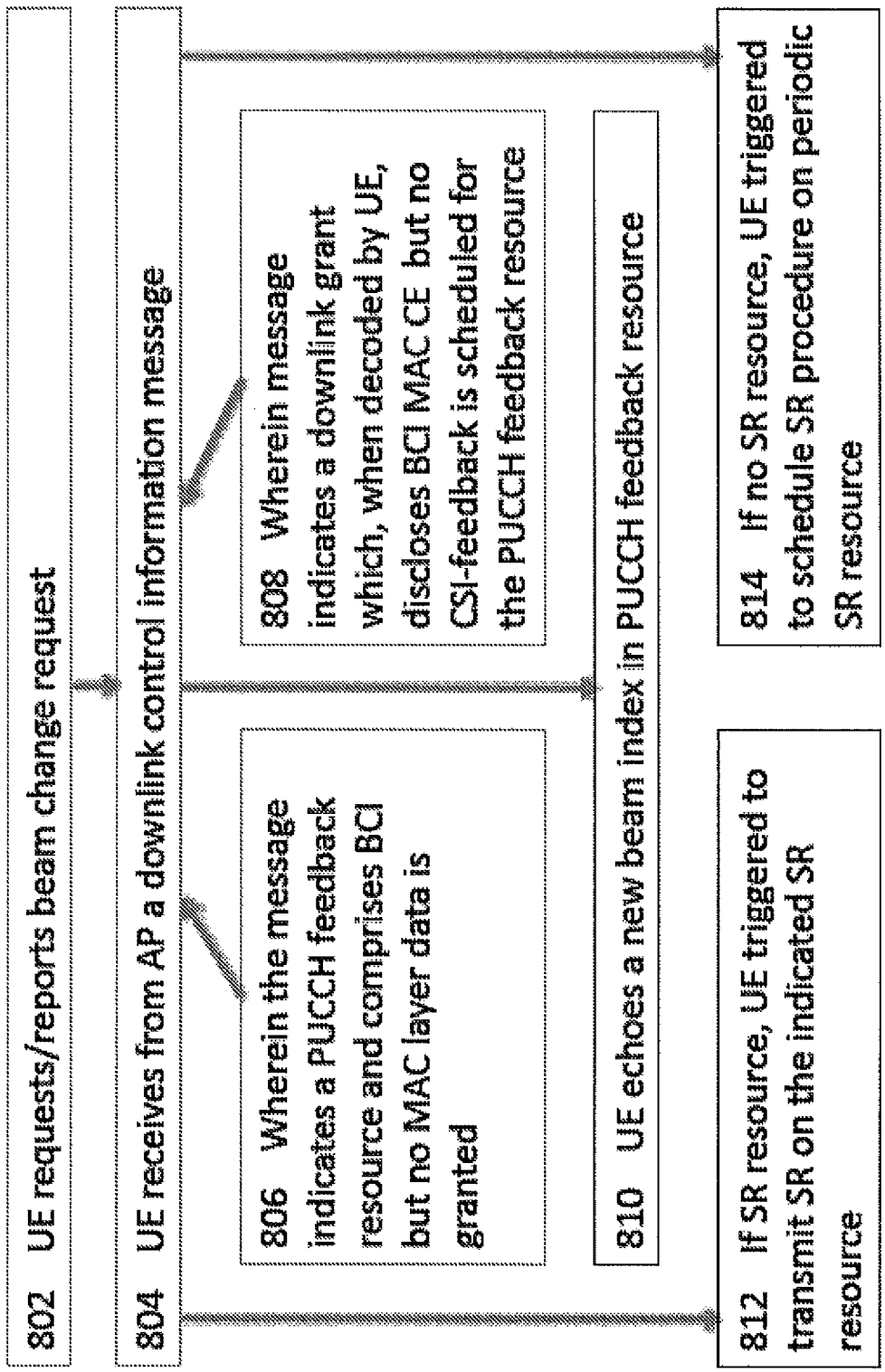
FIG. 8 is a logic flow diagram illustrating the operation of an exemplary method or methods, resulting from an execution of computer program instructions embodied on a computer readable memory, and/or functions performed by logic implemented in hardware or other means, in accordance with exemplary embodiments, which would be possible.

FIG. 8 is a logic flow diagram illustrating the operation of an exemplary method or methods, resulting from an execution of computer program instructions embodied on a computer readable memory, and/or functions performed by logic implemented in hardware or other means, in accordance with exemplary embodiments, which would be possible.

Item 802 represents the UE requesting/reporting beam change request. Item 804 represents the UE receiving a downlink control information message from AP. Item 806 illustrates BCI via the DCI, wherein the message indicates a PUCCH feedback resource and comprises BCI but no MAC layer data is granted, while item 808 illustrates the BCI via MAC CE, wherein message indicates a downlink grant which, when decoded by UE, discloses BCI MAC CE but no CSI-feedback is scheduled for the PUCCH feedback resource. As a result of either, the UE echoes a new beam index in PUCCH feedback resource as shown by item 810. In item 812, if an SR resource was included in the message, then the UE is triggered to transmit SR on the indicated SR resource. In item 814, if no SR resource was included, then UE is triggered to schedule SR procedure on periodic SR resource.

An example of an embodiment, which can be referred to as item 1, is a method that comprises receiving, by a user equipment from an access point in a wireless communications network, a downlink control information message; and in response to the message indicating a physical uplink control channel feedback resource and comprising a beam change indication wherein no MAC layer data is granted, or the message indicating a downlink grant, wherein the downlink grant is decoded by the user equipment to detect a beam change indication MAC control element transmitted by the network, and no CSI-feedback is scheduled for the physical uplink control channel feedback resource, echoing a new beam index by the user equipment in the physical uplink control channel feedback resource.

An example of a further embodiment, which can be referred to as item 2, is the method of item 1, where the beam change indication comprises an indication of a new serving beam different from a currently used serving beam by the access point for either downlink transmission or uplink reception.

An example of a further embodiment, which can be referred to as item 3, is the method of either item above, where the message or the MAC control element indicates a scheduling request resource, triggering by the user equipment transmission of a scheduling request on the indicated scheduling request resource.

An example of a further embodiment, which can be referred to as item 4, is the method of item 3, where the scheduling request is transmitted using the new serving beam.

An example of a further embodiment, which can be referred to as item 5, is the method of items 3 or 4, where the scheduling request is triggered regardless of other scheduling request triggers.

An example of a further embodiment, which can be referred to as item 6, is the method of any item above, where the message or the MAC control element does not indicate a scheduling request resource, in response to the detection of the beam change indication MAC control element, triggering a scheduling request procedure on a periodic scheduling request resource.

An example of a further embodiment, which can be referred to as item 7, is the method of any item above, where, when the message indicates the physical uplink control channel feedback resource, the physical uplink control channel feedback resource scheduled by the network is allocated with a size of at least one beam reported by the user equipment.

An example of a further embodiment, which can be referred to as item 8, is the method of any item above, which further comprises reporting by the user equipment a current serving beam to the access point.

An example of a further embodiment, which can be referred to as item 9, is the method of any item above, where reporting by the user equipment the current serving beam informs the network whether the user equipment changed the beam.

An example of a further embodiment, which can be referred to as item 10, is the method of any item above, which further comprises upon receiving an uplink resource by triggering the scheduling request procedure, generating by the user equipment a beam state information report An example of a further embodiment, which can be referred to as item 11, is the method of any item above, which further comprises triggering the receiving by sending a beam change request by the user equipment to the network.

An example of a further embodiment, which can be referred to as item 12, is the method of item 11, where the beam change request comprises a preferred network communication beam index or a beam state information report.

An example of a further embodiment, which can be referred to as item 13, is the method of any item above, which further comprises in response to the user equipment receiving or detecting the beam change indication, wherein the user equipment has not previously reported beam state information for N measurement periods of a beam reference signal, where N is configurable, transmitting a scheduling request on a scheduling request resource if indicated in the message or triggering a scheduling request procedure if no scheduling request resource is indicated in the message, to report the beam state information.

An example of a further embodiment, which can be referred to as item 14, is the method of any item above, which further comprises in response to the user equipment receiving or detecting the beam change indication, wherein a new serving beam belongs to a different beam group than a current serving beam, transmitting a scheduling request on a scheduling request resource if indicated in the message or triggering a scheduling request procedure if no scheduling request resource is indicated in the message, to validate a group change using the new serving beam An example of a further embodiment, which can be referred to as item 15, is the method of item 14, where groups are reported by the user equipment.

An example of a further embodiment, which can be referred to as item 16, is the method of items 14 or 15, where groups are determined by reception direction of the user equipment.

An example of a further embodiment, which can be referred to as item 17, is the method of any of items 14 through 16, where changing the serving beam in a group does not change beam alignment of the user equipment.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 7. A computer-readable medium may comprise a computer-readable storage medium (e.g., memories 725, 755, 771 or other device) that may be any media or means that can contain, store, and/or transport the instructions for use by or in connection with an instruction execution system, apparatus, or device, such as a computer. A computer-readable storage medium does not comprise propagating signals. Moreover, modules YYY and ZZZ could be where embodiments of the methods herein may be implemented in the UE and gNB, respectively.

Embodiments of the invention could be implemented as an apparatus comprising at least one processor and at least one memory including computer program code, wherein the at least one memory and the computer code are configured with the at least one processor, to cause the apparatus to at least perform the any of the methods disclosed herein can serve as an embodiment of this invention.

Embodiments of the invention could also be implemented as a computer program product embodied on a non-transitory computer-readable medium, in which a computer program is stored which, when being executed by a computer, is configured to provide instructions to control or carry out any of the methods disclosed herein can also serve as an embodiment of this invention.

An example of another embodiment of the present invention, which can be referred to as item 18, is an apparatus comprising: at least one processor; and at least one memory including computer program code, the at least one memory and the computer program code configured to, with the at least one processor, cause the apparatus to perform at least the following: receiving, from an access point in a wireless communications network, a downlink control information message; and in response to the message indicating a physical uplink control channel feedback resource and comprising a beam change indication wherein no MAC layer data is granted, or the message indicating a downlink grant, wherein the downlink grant is decoded by the user equipment to detect a beam change indication MAC control element transmitted by the network, and no CSI-feedback is scheduled for the physical uplink control channel feedback resource, echoing a new beam index in the physical uplink control channel feedback resource.

Embodiments of the present invention may be a combination of means or steps for performing particular aspects or features of the invention which may cover a variety of corresponding structures, materials, or acts and equivalents thereof as described in this specification.

An example of another embodiment of the present invention, which can be referred to as item 19, is an apparatus comprising: means to receive, from an access point in a wireless communications network, a downlink control information message; and in response to the message indicating a physical uplink control channel feedback resource and comprising a beam change indication wherein no MAC layer data is granted, or the message indicating a downlink grant, wherein the downlink grant is decoded by the user equipment to detect a beam change indication MAC control element transmitted by the network, and no CSI-feedback is scheduled for the physical uplink control channel feedback resource, means to echo a new beam index in the physical uplink control channel feedback resource.

Embodiments of the invention described herein may be implemented in software (executed by one or more processors), hardware (e.g., an application specific integrated circuit), or a combination of software and hardware. In an example of an embodiment, the software (e.g., application logic, an instruction set, etc.) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer.

An example of another embodiment of the present invention, which can be referred to as item 20 is a computer program comprising code to perform any of the method described in items 1 through 17 above.

An example of a further embodiment, which can be referred to as item 21, embodied on a computer program product comprising a computer-readable medium bearing the computer program code of item 20 therein for use with a computer.

An example of another embodiment of the present invention, which can be referred to as item 22, is a computer-readable medium encoded with instructions that, when executed by a computer, performs the methods of any of items 1 through 17.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

A technical problem that might be addressed by embodiments of the invention discussed herein is shortening the time to detect failure in beam change procedure.

If desired, the different functions discussed herein may be performed in a different order and/or concurrently with each other. Furthermore, if desired, one or more of the above-described functions may be optional or may be combined.

Although various aspects are set out above, other aspects comprise other combinations of features from the described embodiments, and not solely the combinations described above.

It is also noted herein that while the above describes examples of embodiments of the invention, these descriptions should not be viewed in a limiting sense. Rather, there are several variations and modifications which may be made without departing from the scope of the present invention.

What is claimed is:

1. An apparatus, comprising:
   at least one processor; and
   at least one memory storing instructions that, when executed by the at least one processor, cause the apparatus at least to:
   receive from a network node a mapping that provides an association between an actual beam index value and a logical beam index value;
   perform measurements on a first refinement beam;
   send a measurement report about the first refinement beam to the network node;
   receive, from the network node on a second refinement beam, a downlink control message including a beam change indication to the first refinement beam, wherein the beam change indication refers to the logical beam index value in the received mapping; and
   communicate with the network node using the first refinement beam, based on the beam change indication.

2. The apparatus according to claim 1, wherein the at least one memory further stores instructions that, when executed by the at least one processor, cause the apparatus at least to:
   receive a configuration to perform measurements on a beam refinement reference signal.

3. The apparatus according to claim 1, wherein the at least one memory further stores instructions that, when executed by the at least one processor, cause the apparatus at least to:
   determine reception beam alignment based on the received mapping between the actual beam index value and the logical beam index value and a beam change indicated by the network node in the beam change indication.

4. The apparatus according to claim 1, wherein the at least one memory further stores instructions that, when executed by the at least one processor, cause the apparatus at least to:
   send a beam change validation to the network node using a beam aligned to the first refinement beam.

5. The apparatus according to claim 1, wherein the downlink control message is a medium access control (MAC) control element (CE) or downlink control information (DCI).

6. The apparatus according to claim 1, wherein the downlink control message indicates a physical uplink control channel feedback resource and comprises the beam change indication wherein no medium access control (MAC) layer data is granted.

7. The apparatus according to claim 1, wherein the apparatus comprises a user equipment and the downlink control message indicates a downlink grant, wherein the downlink grant is decoded by the user equipment to detect a beam change indication medium access control (MAC)

control element transmitted by the network node, and no channel state information (CSI) feedback is scheduled for a physical uplink control channel feedback resource.

8. A method, comprising:
receiving, by a user equipment from a network node, a mapping that provides an association between an actual beam index value and a logical beam index value;
performing by the user equipment measurements on a first refinement beam;
sending by the user equipment a measurement report about the first refinement beam to the network node;
receiving, by the user equipment from the network node on a second refinement beam, a downlink control message including a beam change indication to the first refinement beam, wherein the beam change indication refers to the logical beam index value in the received mapping; and
communicating by the user equipment with the network node using the first refinement beam, based on the beam change indication.

9. The method according to claim 8, further comprising:
receiving a configuration to perform measurements on a beam refinement reference signal.

10. The method according to claim 8, further comprising:
determining reception beam alignment based on the received mapping between the actual beam index value and the logical beam index value and a beam change indicated by the network node in the beam change indication.

11. The method according to claim 8, further comprising:
sending a beam change validation to the network node using a beam aligned to the first refinement beam.

12. The method according to claim 8, wherein the downlink control message indicates a physical uplink control channel feedback resource and comprises the beam change indication wherein no medium access control (MAC) layer data is granted.

13. The method according to claim 8, wherein the downlink control message indicates a downlink grant, wherein the downlink grant is decoded by the user equipment to detect a beam change indication medium access control (MAC) control element transmitted by the network node, and no channel state information (CSI) feedback is scheduled for a physical uplink control channel feedback resource.

14. An apparatus, comprising:
at least one processor; and
at least one memory storing instructions that, when executed by the at least one processor, cause the apparatus at least to:
signal to a user equipment a mapping that provides an association between an actual beam index value and a logical beam index value;
receive a measurement report about a first refinement beam from the user equipment;
signal, on a second refinement beam to the user equipment using a downlink control message, a beam change indication to the first refinement beam, wherein the beam change indication refers by-referring-to the logical beam index value from the mapping; and
communicate with the user equipment using the first refinement beam, based on the beam change indication.

15. The apparatus according to claim 14, wherein the at least one memory further stores instructions that, when executed by the at least one processor, cause the apparatus at least to:
configure the user equipment to perform measurements on a beam refinement reference signal; and
send the beam refinement reference signal to the user equipment.

16. The apparatus according to claim 15, wherein the at least one memory further stores instructions that, when executed by the at least one processor, cause the apparatus at least to:
determine a beam change based at least on a measurement report received from the user equipment and based at least on the beam refinement reference signal.

17. The apparatus according to claim 14, wherein the at least one memory further stores instructions that, when executed by the at least one processor, cause the apparatus at least to:
receive a beam change validation from the user equipment.

18. The apparatus according to claim 14, wherein the downlink control message is a medium access control (MAC) control element (CE) or downlink control information (DCI).

19. The apparatus according to claim 14, wherein the downlink control message indicates a physical uplink control channel feedback resource and comprises the beam change indication wherein no medium access control (MAC) layer data is granted.

20. The apparatus according to claim 14, wherein the downlink control message indicates a downlink grant, wherein the downlink grant is decoded by the user equipment to detect a beam change indication medium access control (MAC) control element (CE) transmitted by the apparatus, and no channel state information (CSI) feedback is scheduled for a physical uplink control channel feedback resource.

* * * * *

UNITED STATES PATENT AND TRADEMARK OFFICE
CERTIFICATE OF CORRECTION

PATENT NO. : 12,034,502 B2
APPLICATION NO. : 17/243814
DATED : July 9, 2024
INVENTOR(S) : Timo Koskela, Samuli Turtinen and Juho Pirskanen It is certified that error appears in the above-identified patent and that said Letters Patent is hereby corrected as shown below:

In the Claims

In Claim 14: Column 22, Line 9, delete "by-referring-".

Signed and Sealed this
Seventeenth Day of September, 2024

Katherine Kelly Vidal
*Director of the United States Patent and Trademark Office*